(12) United States Patent
Roos (10) Patent No.: US 8,079,133 B2
(45) Date of Patent: Dec. 20, 2011

(54) METHOD FOR THE PRODUCTION OF A ROTOR WINDING FOR AN ELECTRIC MACHINE

(75) Inventor: Gerald Roos, Sasbachried (DE)

(73) Assignee: Robert Bosch GmbH, Stuttgart (DE)

( * ) Notice: Subject to any disclaimer, the term of this patent is extended or adjusted under 35 U.S.C. 154(b) by 742 days.

(21) Appl. No.: 11/722,959

(22) PCT Filed: Nov. 3, 2005

(86) PCT No.: PCT/EP2005/055718
§ 371 (c)(1),
(2), (4) Date: Jun. 27, 2007

(87) PCT Pub. No.: WO2006/069842
PCT Pub. Date: Jul. 6, 2006

(65) Prior Publication Data
US 2008/0093943 A1    Apr. 24, 2008

(30) Foreign Application Priority Data

Dec. 27, 2004 (DE) .......................... 10 2004 062 813

(51) Int. Cl.
*H02K 15/095* (2006.01)
(52) U.S. Cl. ..................... 29/598; 310/154.45; 310/198
(58) Field of Classification Search .................... 29/596, 29/598; 310/154.01, 195–209
See application file for complete search history.

(56) References Cited

U.S. PATENT DOCUMENTS

| 4,377,784 | A | * | 3/1983 | Saito et al. ..................... 324/772 |
| 5,267,699 | A | * | 12/1993 | Lombarbi ................... 242/433.3 |
| 6,891,304 | B1 | | 5/2005 | Cros et al. |
| 2005/0184612 | A1 | | 8/2005 | Cros et al. |

FOREIGN PATENT DOCUMENTS

| EP | 0 526 819 A2 | 2/1993 |
| EP | 1 489 724 A1 | 12/2004 |
| JP | 11-341722 | 12/1999 |
| JP | 2000-341892 | 12/2000 |
| WO | WO 02/21665 A2 | 3/2002 |
| WO | WO 0221665 A2 * | 3/2002 |

OTHER PUBLICATIONS

Andreas Binder, "Comparison of the Electromagnetical Performance of Simplex Wave and Lap Windings", IEEE Transactions on Energy Conversion, Dec. 1993, pp. 698-703, vol. 8, No. 4, USA.

* cited by examiner

*Primary Examiner* — Livius R Cazan
(74) *Attorney, Agent, or Firm* — Ronald E. Greigg (57) ABSTRACT

The invention relates to a method for producing the rotor winding of an electric machine comprising at least four exciter poles in the stator and a commutator rotor with a number of pole teeth which deviates from the number of exciter poles as well as a number of individual tooth coils and commutator segments that is at least twice as large as the number of pole teeth. In order to obtain low torque ripple and a long service life by optimally commutating the coils, a first coil is wound from an initial segment at a selectable offset angle to the initial segment on a first pole tooth, the winding wire is then fixed to another commutator segment at a predefined segment interstice length, whereupon a coil is successively wound from each segment onto the pole tooth having the lowest angular error relative the offset angle in relation to the pole separation of the stator, and the winding wire is then contacted on another segment at the same segment interstice length.

14 Claims, 8 Drawing Sheets

| Coil | La | Pole Tooth | re / li | Le | |
|------|----|-----------|---------|-----|---|
| 1 | 2 | 1 | re | 9 | |
| 2 | 9 | 3 | li | 16 | |
| 3 | 16 | 8 | re | 3 | Fig. a |
| 4 | 3 | 10 | li | 10 | |
| 5 | 10 | 5 | re | 17 | |
| 6 | 17 | 7 | li | 4 | |
| 7 | 4 | 2 | re | 11 | |
| 8 | 11 | 4 | li | 18 | Fig. b |
| 9 | 18 | 9 | re | 5 | |
| 10 | 5 | 1 | li | 12 | |
| 11 | 12 | 6 | re | 19 | |
| 12 | 19 | 8 | li | 6 | |
| 13 | 6 | 3 | re | 13 | Fig. c |
| 14 | 13 | 5 | li | 20 | |
| 15 | 20 | 10 | re | 7 | |
| 16 | 7 | 2 | li | 14 | |
| 17 | 14 | 7 | re | 1 | |
| 18 | 1 | 9 | li | 8 | Fig. d |
| 19 | 8 | 4 | re | 15 | |
| 20 | 15 | 6 | li | 2 | |

| Coil | La | Pole Tooth | re / li | Le |
|---|---|---|---|---|
| 1 | 3 | 1 | re | 11 |
| 2 | 11 | 5 | li | 4 |
| 3 | 4 | 5 | li | 12 |
| 4 | 12 | 4 | re | 5 |
| 5 | 5 | 3 | li | 13 |
| 6 | 13 | 3 | li | 6 |
| 7 | 6 | 2 | re | 14 |
| 8 | 14 | 1 | li | 7 |
| 9 | 7 | 1 | li | 15 |
| 10 | 15 | 5 | re | 8 |
| 11 | 8 | 4 | li | 1 |
| 12 | 1 | 4 | li | 9 |
| 13 | 9 | 3 | re | 2 |
| 14 | 2 | 2 | li | 10 |
| 15 | 10 | 2 | li | 3 |

| Coil | La | Pole Tooth | re / li | Le |
|---|---|---|---|---|
| 1 | 3 | 1 | re | 10 |
| 2 | 10 | 9 | li | 17 |
| 3 | 17 | 9 | li | 24 |
| 4 | 24 | 8 | re | 4 |
| 5 | 4 | 7 | li | 11 |
| 6 | 11 | 7 | li | 18 |
| 7 | 18 | 6 | re | 25 |
| 8 | 25 | 5 | li | 5 |
| 9 | 5 | 5 | li | 12 |
| 10 | 12 | 4 | re | 19 |
| 11 | 19 | 3 | li | 26 |
| 12 | 26 | 3 | li | 6 |
| 13 | 6 | 2 | re | 13 |
| 14 | 13 | 1 | li | 20 |
| 15 | 20 | 1 | li | 27 |
| 16 | 27 | 9 | re | 7 |
| 17 | 7 | 8 | li | 14 |
| 18 | 14 | 8 | li | 21 |
| 19 | 21 | 7 | re | 1 |
| 20 | 1 | 6 | li | 8 |
| 21 | 8 | 6 | li | 15 |
| 22 | 15 | 5 | re | 22 |
| 23 | 22 | 4 | li | 2 |
| 24 | 2 | 4 | li | 9 |
| 25 | 9 | 3 | re | 16 |
| 26 | 16 | 2 | li | 23 |
| 27 | 23 | 2 | li | 3 |

Fig. 9

| Coil | La | Pole Tooth | re / li | Le |
|---|---|---|---|---|
| 1 | 2 | 1 | re | 7 |
| 2 | 7 | 6 | re | 12 |
| 3 | 12 | 6 | re | 17 |
| 4 | 17 | 11 | re | 22 |
| 5 | 22 | 11 | re | 3 |
| 6 | 3 | 4 | re | 8 |
| 7 | 8 | 4 | re | 13 |
| 8 | 13 | 9 | re | 18 |
| 9 | 18 | 9 | re | 23 |
| 10 | 23 | 2 | re | 4 |
| 11 | 4 | 2 | re | 9 |
| 12 | 9 | 7 | re | 14 |
| 13 | 14 | 7 | re | 19 |
| 14 | 19 | 12 | re | 24 |
| 15 | 24 | 12 | re | 5 |
| 16 | 5 | 5 | re | 10 |
| 17 | 10 | 5 | re | 15 |
| 18 | 15 | 10 | re | 20 |
| 19 | 20 | 10 | re | 1 |
| 20 | 1 | 3 | re | 6 |
| 21 | 6 | 3 | re | 11 |
| 22 | 11 | 8 | re | 16 |
| 23 | 16 | 8 | re | 21 |
| 24 | 21 | 1 | re | 2 |

METHOD FOR THE PRODUCTION OF A ROTOR WINDING FOR AN ELECTRIC MACHINE

CROSS-REFERENCE TO RELATED APPLICATION

This application is a 35 USC 371 application of PCT/EP 2005/055718 filed on Nov. 3, 2005.

BACKGROUND OF THE INVENTION

1. Field of the Invention

The invention relates to a method for producing the rotor winding of an electric machine and to an electric machine having a rotor winding produced by this method.

2. Description of the Prior Art

From German Patent DE 197 57 279 C1, it is known, in a four-pole electric motor, to use a commutator rotor with 12 commutator laminations and 12 coils connected to them, in order to attain low torque waviness and good commutation. The laminations that are diametrically opposed to one another are connected to one another via contact bridges, in order to make the current supply to the rotor symmetrical and to assure it with only one pair of brushes. In such machines, the rotor current is not distributed to two coil lanes, but instead, because of the contact bridges, to four coil lanes, with the disadvantage that per coil lane, only half as many coils are connected in series. Thus the commutator voltage at the coils is increased accordingly. This causes greater wear of the carbon brushes on the commutator and thus a correspondingly limited service life or durability of the motor. The coils of the rotor are furthermore wound over three pole teeth each, so that their winding heads intersect at the face ends of the rotor. This causes greater cantilevering of the winding heads and leads to long winding head connections of the coils, which are expensive in terms of material and also cause high heat losses.

From U.S. Pat. No. 4,532,449, a four-pole electric machine with a commutator rotor is also known, in which the number of rotor coils is only half as great as the number of commutator laminations. In it, five coils are supplied from one brush pair via 10 laminations. The coils are continuously wound as single-tooth windings, with a skip each time of one pole tooth from one coil to the next. The beginning and end of the coils are each contacted with laminations between which one lamination remains unoccupied. For supplying current to the coils via contact bridges, these unoccupied laminations are connected to the laminations diametrically opposite them, and these diametrically opposite laminations are connected to the coils. This embodiment has the disadvantage that because of an increased lamination voltage, with five coils instead of twelve, an increased brush fire occurs, which impairs the service life of the commutator and hence also the durability of the machine.

With the present embodiment, the object is, in electric machines with single-tooth coils and high numbers of poles, to improve the commutation and thus the service life of the machine.

SUMMARY AND ADVANTAGES OF THE INVENTION

The method for producing the rotor winding of an electric machine of the invention has the advantage that the single-tooth coils, wound onto the pole teeth in a uniformly distributed manner, with a view to the pole pitch of the stator, occupy a position with the least possible electrical angle error. As a result, the commutation losses as well as radially acting force excitations at the rotor can be minimized, and hence the machine durability can be increased. Furthermore, by the use of single-tooth coils, cantilevered, long winding head connections are avoided. Because of the equal, even number of coils and commutator laminations, the coils are distributed uniformly over only two branches.

Simple and economical production of the rotor winding is obtained by providing that a plurality of single-tooth coils, preferably all of them, are continuously wound in succession, and that the beginning and end of the single-tooth coils, as a kind of wave winding, are contacted in one and the same winding direction with the lamination increment width at the respective commutator laminations, and the end lamination of the previous coil in each case forms the beginning lamination for the next single-tooth coil to be wound. Advantageously, the lamination increment width Y of the single-tooth coils S is predetermined, as a function of the number of laminations N and the number of pole pairs p of the stator 11, such that the equation $|Y-N/p| \leq 0.5$ is satisfied. Furthermore, in a simple way, the end of the first single-tooth coil is contacted with the lamination that was ascertained beforehand in accordance with the equation $Le1=(La1+Y) \bmod N$, and this lamination forms the lamination La2 for the beginning of the next single-tooth coil to be wound; and that after that, each further coil is contacted, at the lamination increment width, with the laminations of the commutator.

In order to find the optimal position for the single-tooth coils, in each case with a view to the pole pitch of the stator, it is proposed in a refinement of the invention that for each next coil to be wound, first for each of the pole teeth at the rotor the electrical angle error, referred to a pole pitch, is ascertained with respect to the predetermined angular offset; that then the absolute values of the ascertained angle errors are compared with one another; and that by means of this comparison, the pole tooth having the least electrical angle error is ascertained, and the next coil is wound onto that pole tooth. To that end, in a refinement of the invention, it is proposed that for each pole tooth, the electrical angle error Wf is ascertained, preferably as a cosine value of the angle error, repeating periodically to the number of pole pairs, in each case in accordance with the following equation:

$$Wf(j) = \cos 2\pi * p/z * (j - Lai/M),$$

in which the multiplier $M=s/z$ is the number of coils per pole tooth, s is the total number of coils, z is the number of pole teeth, and j is the particular pole tooth. For ascertaining the least angle error relative to the predetermined angular offset, is simpler, when electronic computers are used, if each of the cosine values of the electrical angle error are ascertained and compared with one another; the next single-tooth coil is then wound onto the pole tooth having the greatest absolute cosine value as an angle error. Moreover, at the same time the winding direction of the coils can be determined by the sign of the angle error cosine value. Since because there are so many pole teeth, angle errors of equal magnitude can be ascertained for a plurality of pole teeth, it is proposed, to attain short connections between the laminations and the coils, that the single-tooth coils each be wound onto the pole tooth which is located in the region between the beginning lamination and the end lamination of the coils. To attain a uniform distribution of the single-tooth coils on all the pole teeth, it is furthermore provided that each single-tooth coil is wound onto the next pole tooth that does not yet have the predetermined number of coils. In order to avoid relatively long connections between the laminations and the coils on the commutator side of the rotor 13, it is proposed that the winding wire be passed between the beginning lamination and end lamination and a coil between two more closely located pole teeth to the back side of the armature, and from there, in particular between two further pole teeth, back to the front side and then to the coil or to the lamination.

To attain the method steps listed, it is provided that the beginning and end laminations and the pole tooth and the winding direction of the coils are ascertained by a computer in the form of a winding table; that the winding table is then input into an automatic winder and processed by it in winding the coils.

In an expedient application of the invention, it is proposed that for a six-pole electric machine, 20 single-tooth coils are continuously wound onto its rotor by an automatic winder onto 10 pole teeth; and that the single-tooth coils, at a lamination increment width of 7 laminations, are contacted with 20 laminations of a commutator.

For a four-pole electric machine, 15 single-tooth coils are continuously wound onto its rotor by an automatic winder onto 5 pole teeth; and that the single-tooth coils, at a lamination increment width of 8 laminations, are contacted with 15 laminations of a commutator.

For an eight-pole electric machine, 27 single-tooth coils are continuously wound onto its rotor by an automatic winder onto 9 pole teeth; and that the single-tooth coils, at a lamination increment width of 7 laminations, are contacted with 27 laminations of a commutator.

For a ten-pole electric machine, 24 single-tooth coils are continuously wound onto its rotor by an automatic winder onto 12 pole teeth; and that the single-tooth coils, at a lamination increment width of 5 laminations, are contacted with 24 laminations of a commutator.

BRIEF DESCRIPTION OF THE DRAWINGS

The invention is described below in examples in conjunction with the drawings, in which.

DESCRIPTION OF THE PREFERRED EMBODIMENTS

Figure 1:
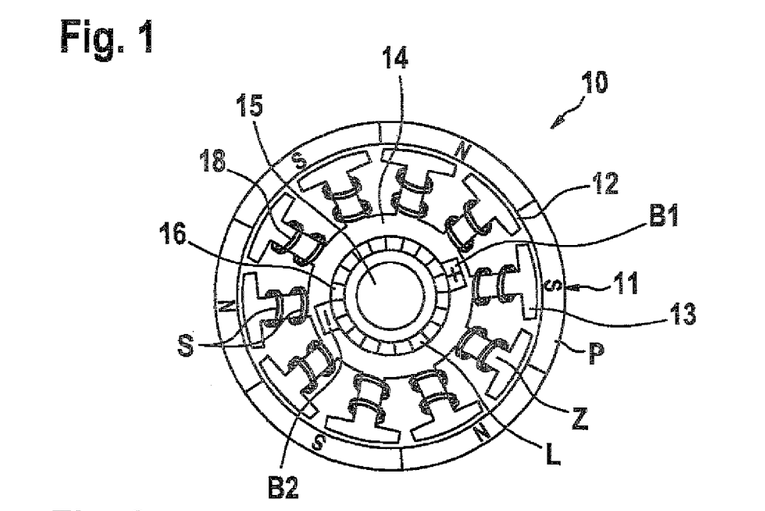
FIG. 1 is a schematic illustration of the electric machine of the invention in a front or end view.

In FIG. 1, for a first exemplary embodiment, a permanent-magnetically excited six-pole direct current motor, as an electric machine, is schematically shown in front view and marked 10. Such machines are preferentially used for control drives, blowers, and the like in motor vehicles and must function reliably under heavy loads, if at all possible over the entire service life of the vehicle. Accordingly, their construction must be as robust as possible. The electric machine has a six-pole stator 11, which cooperates across a working air gap 12 with a commutator rotor 13, hereinafter called the rotor. The rotor 13 comprises a lamination packet 14, which is secured to a rotor shaft 15 that is supported on both ends. Ten pole teeth Z distributed uniformly are disposed on the circumference of the lamination packet 14, and between each of them, slots are embodied for receiving a total of twenty coils S of a rotor winding 18. The coils S are produced as single-tooth coils in pairs, each about one pole tooth Z, by means of automatic winders. The coils S are wired in a special way to a commutator 16, seated on the rotor shaft 15 on the front face end of the lamination packet 14. The commutator 16 has twenty laminations L, distributed uniformly over the circumference, which cooperate with two stationary carbon brushes B1 and B2. The carbon brushes are offset from one another by 180° and for the operation of the electric machine are supplied with direct current. The ten pole teeth Z of the rotor 13 cooperate with three pairs p of exciter poles of the stator 11. To attain the least possible torque waviness of the electric machine, the number of pole teeth differs from the number of exciter poles.

Figure 2:
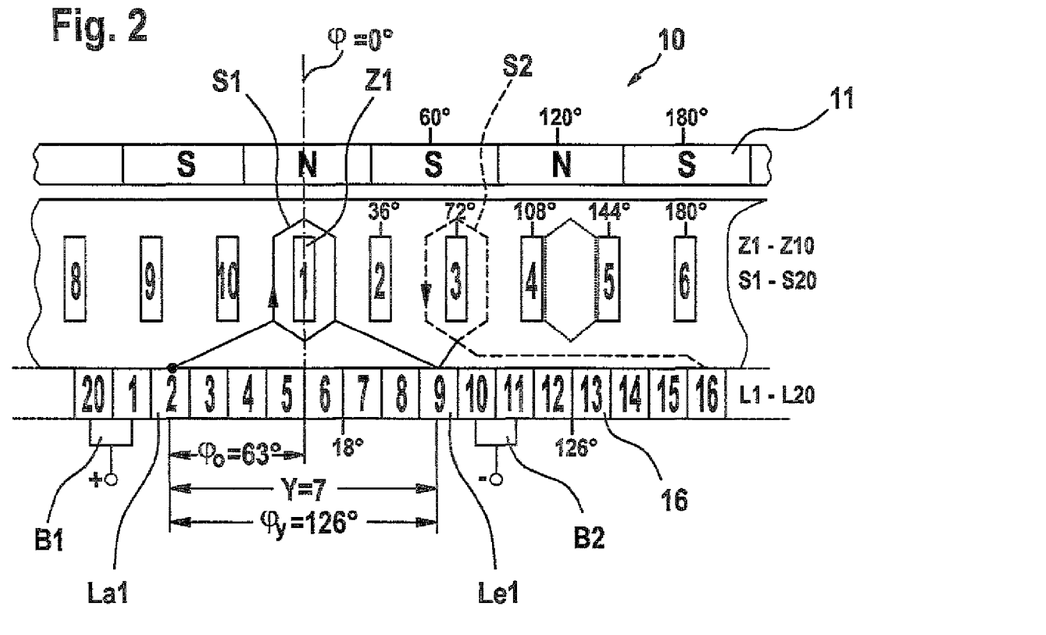
FIG. 2 is a developed view of the machine of FIG. 1, shown schematically, with a first single-tooth coil.

FIG. 2 schematically shows a developed view of the direct current motor 10 of FIG. 1, with which the winding method for producing and disposing the coils S on the pole teeth Z of the rotor 13 will be described in further detail below. In this drawing, the six-pole stator 11, the ten pole teeth Z1 through Z10, the first single-tooth coil S1, and the twenty laminations L1 through L20 of the commutator 16 can all be seen. The disposition of the first coil can be selected freely and is associated here with the first pole tooth Z1. The first pole tooth Z1 with the first coil Si is moreover associated here with the center of a north pole of the stator 11. This association is likewise freely selectable. Moreover, the also freely selectable association of the commutator laminations L with the pole teeth Z is selected here such that the first pole tooth Z1 is located precisely at the level of the lamination slot between the laminations L5 and L6 of the commutator 16. This position should now, as shown in FIG. 2, have the angular location on the circumference of $\phi=0°$. As a result, the adjacent south pole of the stator 11 is located at the position of 60°; the adjacent pole tooth Z2 is located at the position of 36°; and the next lamination slot is located at the position of 18°. It is furthermore defined that all the coils are contacted at their beginning to a respective beginning lamination La and at their end to an end lamination Le. In FIG. 2, the lamination L2 for the first coil S1 forms the freely selectable beginning lamination La1. As a result of the disposition selected here of the position of the lamination L2, there is consequently an angular offset $\phi_0$ of 63° between the beginning lamination La1 of coil S1 and the pole tooth Z1 provided for that coil. In FIG. 2, the optimal location of the coil S1 is centrally beneath one pole (the north pole) of the stator 11. This position has an angle error of Wf=0°.

To enable winding the single-tooth coil S continuously onto the pole teeth Z in the manner of a wave winding, a lamination increment width Y for all the coils S is defined that assures that the end of each coil is contacted with an unoccupied lamination L. In FIG. 2, lamination increment width Y of seven laminations is provided; that is, Y=7. To set up a wind ing table in accordance with FIG. 3 by the method of the invention, the following definitions will first be made:
p=number of pole pairs
z=number of teeth
N=number of laminations
s=number of coils
M=multiplier=N/z=s/z
Y=lamination increment
Wf=angle error (deviation from the optimal location of the coils S)
Wz=number of windings of the coils S
i=the respective coil 1, 2, 3 . . . , s
j=the respective pole tooth 1, 2, 3 . . . , z To set up a winding scheme, the following further conditions must also be met:
p>1
p<z<4p
z≠2p, and z≠3p
M>1
M≠integral multiple of p
M≠integral divisor of p
N=s=M*z
|Y−N/p|≦0.5

All the coils are contacted with a respective beginning lamination La and end lamination Le. By the free definition of the first beginning lamination La1, the beginning and end laminations for the all coils i result in accordance with the equation:

$$Lai = (La1 + [(i-1)*Y]) \bmod N \text{ (mod=modular)}$$

$$\text{and } Lei = (Lai + Y) \bmod N \quad (1)$$

The modular range of values for the laminations N is between 1 and 20, in this example that has 20 laminations.

For each further coil S of the stator 11, in a first pass for each pole tooth Z, the angle error Wf is then ascertained for optimal location with respect to torque formation and brush fire minimization, specifically beginning at the first coil S1 having the angle error of 0°. For the coil 2 shown in dashed lines in FIG. 2, the optimal location with the angular offset $\phi_0$ of 63° relative to the beginning lamination L9, would be a position between the pole teeth Z4 and Z5, as indicated there by dotted lines. Further optimal positions are each offset from one another by one pole pitch (360°/2p), or in other words by 60° from one another. The pole teeth available for the coil 2, however, have a deviation, here called an angle error, from the optimal pole positions referred to the pitch pole of the machine. For each coil, the pole tooth having the least deviation from one of the optimal locations must therefore be found. To simplify the calculation, the cosine value of the periodic electrical angle error, referred to one pole pair, of each further coil is therefore ascertained for each pole tooth, in accordance with the equation:

$$Wf(j) = \cos[2\pi*p/z*(j-Lai/M)] \quad (2)$$

In a further pass, the ascertained angle errors Wf of the coil i at the teeth j are then compared with one another, in order to ascertain the pole tooth Z or pole teeth Z that have the greatest cosine value of the angle errors Wf. This is done by the following equation:

$$|Wf(j)| = Wfmax; Wfmax = \max(|Wf(1)|, |Wf(2)|, |Wf(3)|, \ldots) \quad (3)$$

in which Wfmax is the greatest previously ascertained comparison value for the coil i.

The sign of the angle errors Wf obtained by equation (2) indicates whether the optimal location of the coil relates to a north pole or a south pole of the stator. It is defined that—beginning at the first coil S1—if the cosine value is positive, the coils S are wound in the same direction, clockwise. The result for each coil i with a view to the pole tooth Z ascertained for it is that at a negative cosine value of the angle error Wf(j), the winding direction of the coil is changed; that is, the coil must be wound counterclockwise onto the selected tooth Z, counter to the winding direction of the first coil.

Figure 3:
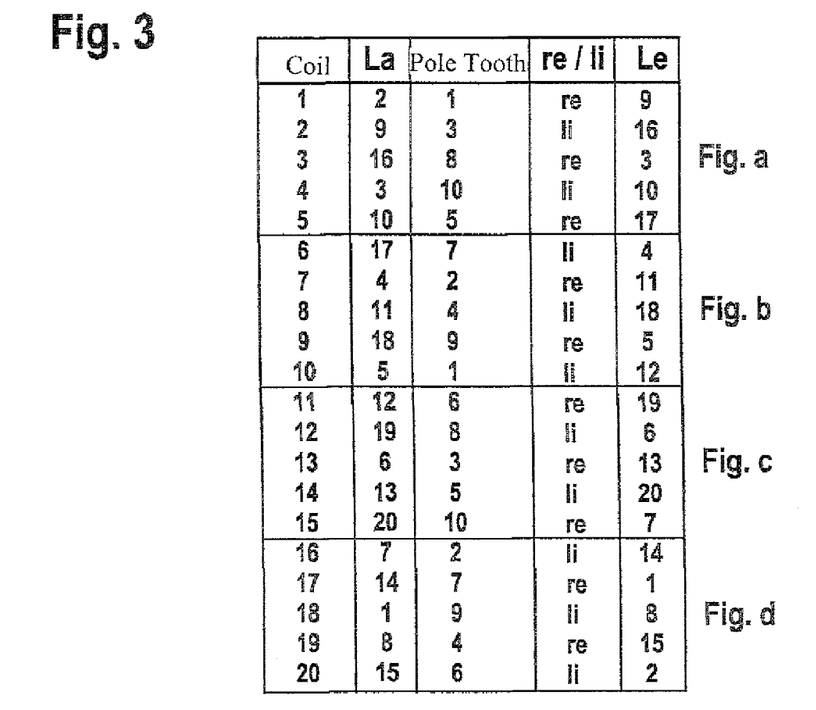
FIG. 3, in a first exemplary embodiment, shows the winding table, produced in accordance with the method of the invention.

For the direct current motor 10 of FIG. 1, with the aid of equations (1), (2) and (3), a winding table shown in FIG. 3 will now be set up, in which the first coil S1 is disposed on the pole tooth Z1 as in FIG. 2. Since the calculation of the angle errors is done by means of a computer, equations (2) and (3) are also employed for the first coil.

For the first exemplary embodiment, the following numbers apply:

| | |
|---|---|
| Number of pole pairs | p = 3 |
| Number of pole teeth | z = 10 |
| Number of laminations | N = 20 |
| Number of coils | s = 20 |
| Multiplier | M = 2 |
| Lamination increment width | Y = 7 |
| Number of windings | Wz = 11 |

With these values, the conditions listed above are met. With the two equations (1), the beginning lamination Lai and end lamination Lei are now defined for each coil Li.

Coil Contacting at the Commutator:

| Lai = (La1 + [(i − 1) * Y]) mod 20; Lei = (Lai + Y) mod 20 | |
|---|---|
| Coil 1: La1 = (2 + (1 − 1)*7) mod 20 = 2; | Le1 = (2 + 7) mod 20 = 9 |
| Coil 2: La2 = (2 + (2 − 1)*7) mod 20 = 9; | Le2 = (9 + 7) mod 20 = 16 |
| Coil 3: La3 = (2 + (3 − 1)*7) mod 20 = 16; | Le3 = (16 + 7) mod 20 = 3 |
| Coil 4: La4 = (2 + (4 − 1)*7) mod 20 = 3; | Le4 = (3 + 7) mod 20 = 10 |
| Coil 5: La5 = (2 + (5 − 1)*7) mod 20 = 10; | Le5 = (10 + 7) mod 20 = 17 |
| Coil 6: La6 = (2 + (6 − 1)*7) mod 20 = 17; | Le6 = (17 + 7) mod 20 = 4 |
| Coil 7: La7 = (2 + (7 − 1)*7) mod 20 = 4; | Le7 = (4 + 7) mod 20 = 11 |
| Coil 8: La8 = (2 + (8 − 1)*7) mod 20 = 11; | Le8 = (11 + 7) mod 20 = 18 |
| Coil 9: La9 = (2 + (9 − 1)*7) mod 20 = 18; | Le9 = (18 + 7) mod 20 = 5 |
| Coil 10: La10 = (2 + (10 − 1)*7) mod 20 = 5; | Le10 = (5 + 7) mod 20 = 12 |
| Coil 11: La11 = (2 + (11 − 1)*7) mod 20 = 12; | Le11 = (12 + 7) mod 20 = 19 |
| Coil 12: La12 = (2 + (12 − 1)*7) mod 20 = 19; | Le12 = (19 + 7) mod 20 = 6 |
| Coil 13: La13 = (2 + (13 − 1)*7) mod 20 = 6; | Le13 = (6 + 7) mod 20 = 13 |
| Coil 14: La14 = (2 + (14 − 1)*7) mod 20 = 13; | Le14 = (13 + 7) mod 20 = 20 |
| Coil 15: La15 = (2 + (15 − 1)*7) mod 20 = 20; | Le15 = (20 + 7) mod 20 = 7 |
| Coil 16: La16 = (2 + (16 − 1)*7) mod 20 = 7; | Le16 = (7 + 7) mod 20 = 14 |
| Coil 17: La17 = (2 + (17 − 1)*7) mod 20 = 14; | Le17 = (14 + 7) mod 20 = 1 |
| Coil 18: La18 = (2 + (18 − 1)*7) mod 20 = 1; | Le18 = (1 + 7) mod 20 = 8 |
| Coil 19: La19 = (2 + (19 − 1)*7) mod 20 = 8; | Le19 = (8 + 7) mod 20 = 15 |
| Coil 20: La20 = (2 + (20 − 1)*7) mod 20 = 15; | Le20 = (15 + 7) mod 20 = 2 |

Ascertaining Angle Error:
For every coil S, for all the pole teeth Z, the respective angle error Wf is ascertained in accordance with equation (2).
Angle Error of Coil 1:

$$Wf(j)=\cos [2\pi \times p/z \times (j-Lai/M)]$$

Tooth 1: Wf(1)=cos [2π*3/10*(1−2/2)]=1.0
Tooth 2: Wf(2)=cos [2π*3/10*(2−2/2)]=−0.309
Tooth 3: Wf(3)=cos [2π*3/10*(3−2/2)]=−0.809
Tooth 4: Wf(4)=cos [2π*3/10*(4−2/2)]=−0.809
Tooth 5: Wf(5)=cos [2π*3/10*(5−2/2)]=−0.309
Tooth 6: Wf(6)=cos [2π*3/10*(6−2/2)]=−1.0
Tooth 7: Wf(7)=cos [2π*3/10*(7−2/2)]=−0.309
Tooth 8: Wf(8)=cos [2π*3/10*(8−2/2)]=−0.809
Tooth 9: Wf(9)=cos [2π*3/10*(9−2/2)]=−0.809
Tooth 10: Wf(10)=cos [2π*3/10*(10−2/2)]=−0.309

In the next pass, for coil 1, the pole tooth that has the least angle error Wf, or the greatest angle error cosine value Wfmax, is ascertained, using equation (3):

$$Wf\max=\max(|(Wf(1)|,|(Wf(2)|,|(Wf(3)|,\ldots)=1.0$$

Comparison of Angle Error
|Wf(1)|=Wfmax: 1.0=1.0: Condition met
|Wf(2)|=Wfmax: 0.309≠1.0: Condition not met
|Wf(3)|=Wfmax: 0.809≠1.0: Condition not met
|Wf(4)|=Wfmax: 0.309≠1.0: Condition not met
|Wf(5)|=Wfmax: 0.809≠1.0: Condition not met
|Wf(6)|=Wfmax: 1.0=1.0: Condition met
|Wf(7)|=Wfmax: 0.309≠1.0: Condition not met
|Wf(8)|=Wfmax: 0.809≠1.0: Condition not met
|Wf(9)|=Wfmax: 0.809≠1.0: Condition not met
|Wf(10)|=Wfmax: 0.309≠1.0: Condition not met Since here a plurality of pole teeth (Z1 and Z6) have the same least absolute angle error, from these pole teeth the pole tooth Z that is located in the region between the beginning lamination La and the end lamination Le of the coil S is selected. It is also checked whether, for the selected tooth Z, the predetermined number of coils S has already been selected, according to the multiplier M.

Outcome of the Comparison:
The coil 1 can be wound onto tooth 1. The ascertained value is positive, and hence the coil 1 is wound clockwise. This defines the first line of the winding table in FIG. 3.

The same calculations are now made in accordance with equation (2) for coil 2, with the beginning lamination La2=9.
Angle Error of Coil 2:

$$Wf(j)=\cos [2\pi *p/z*(j-Lai/M)]$$

Tooth 1: Wf(1)=cos [2π*3/10*(1−9/2)]=0.951
Tooth 2: Wf(2)=cos [2π*3/10*(2−9/2)]=0.000
Tooth 3: Wf(3)=cos [2π*3/10*(3−9/2)]=−0.951
Tooth 4: Wf(4)=cos [2π*3/10*(4−9/2)]=0.588
Tooth 5: Wf(5)=cos [2π*3/10*(5−9/2)]=0.588
Tooth 6: Wf(6)=cos [2π*3/10*(6−9/2)]=−0.951
Tooth 7: Wf(7)=cos [2π*3/10*(7−9/2)]=0.000
Tooth 8: Wf(8)=cos [2π*3/10*(8−9/2)]=0.951
Tooth 9: Wf(9)=cos [2π*3/10*(9−9/2)]=−0.588
Tooth 10: Wf(10)=cos [2π*3/10*(10−9/2)]=−0.588

In the next pass, for coil 2, the pole tooth that has the least angle error Wf, or the greatest angle error cosine value Wfmax, is ascertained, using equation (3):

$$Wf\max=\max(|(Wf(1)|,|(Wf(2)|,|(Wf(3)|,\ldots)=0.951$$

Comparison of Angle Error
|Wf(1)|=Wfmax: 0.951=0.951: Condition met
|Wf(2)|=Wfmax: 0.000≠0.951: Condition not met
|Wf(3)|=Wfmax: 0.951=0.951: Condition met
|Wf(4)|=Wfmax: 0.588≠0.951: Condition not met
|Wf(5)|=Wfmax: 0.588≠0.951: Condition not met
|Wf(6)|=Wfmax: 0.951=0.951: Condition met
|Wf(7)|=Wfmax: 0.000≠0.951: Condition not met
|Wf(8)|=Wfmax: 0.951=0.951: Condition met
|Wf(9)|=Wfmax: 0.588≠0.951: Condition not met
|Wf(10)|=Wfmax: 0.588≠0.951: Condition not met Since here a plurality of pole teeth have the same least absolute angle error, from these pole teeth the pole tooth Z that is located in the region between the beginning lamination La and the end lamination Le of the coil S is selected. It is also checked whether, for the selected tooth Z, the predetermined number of coils S has already been selected, according to the multiplier M.

Outcome of the Comparison:
The coil 2 can be wound onto tooth 3. The ascertained value is negative, and hence the coil 2 is wound counterclockwise. Thus the first line of the winding table in FIG. 3 is also defined.

The same calculations are now made in accordance with equations (2) and (3) for the remaining coils 3-20, and thus the winding table in FIG. 3 is set up line by line. Now in order to be able to wind the rotor 13 of the direct current motor 10 by the method of the invention, the winding table of FIG. 3 is first input into an automatic winder.

The automatic winder, not shown, executes the winding table of FIG. 3 line by line, with the coils S1 through S20 being wound continuously in succession and each contacted with the laminations L, associated with them, of the commutator 16. In FIG. 43 the production of the coils in accordance with the winding table in FIG. 3 is shown in four segments a) through d) and is described below.

Figure 4A:
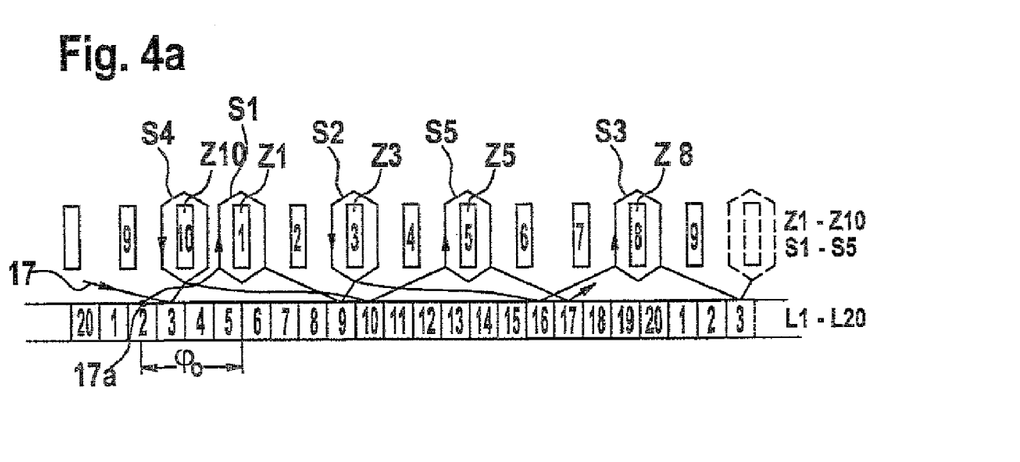
FIGS. 4a, 4b, 4c, and 4d schematically show the production of the rotor winding in accordance with the winding table of FIG. 3 in four segments a)-d)

The winding wire 17 is first, in accordance with segment a), contacted by its beginning 17a to the lamination L2. From there, it is passed to the pole tooth Z1, and the coil S1 is wound—as indicated by an arrow—clockwise around the pole tooth Z1. The coil end is contacted with the lamination L9. From there, the coil S2 is now wound counterclockwise onto the pole tooth Z3, and the coil end is placed at lamination L16. From there, the coil S3 is wound clockwise onto the pole tooth Z8, and the coil end is placed at lamination L3. From there, the coil S4 is wound counterclockwise onto the pole tooth Z10, and the coil end is contacted with the lamination L10. From there, the coil S5 is wound clockwise onto the pole tooth Z5, and the coil end is contacted with the lamination L17. From the lamination L17, the coil wire is transferred, as indicated by the arrow, to the segment b) in FIG. 3.

Figure 4B:
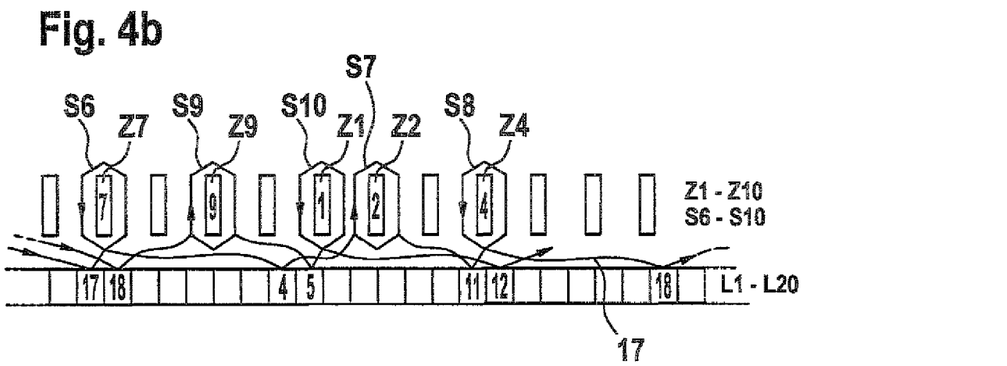

There, from lamination L17, the coil S6 is wound counterclockwise onto the pole tooth Z7, and the coil end is contacted with the lamination L4. From there, the coil S7 is wound clockwise onto the pole tooth Z2, and the coil end is contacted with the lamination L11. From lamination L11, the coil S8 is now wound clockwise onto the pole tooth Z4, and the coil end is contacted with the lamination L18. From there, the coil S9 is wound clockwise onto the pole tooth Z9, and the coil end is contacted with the lamination L5. From lamination L5, the coil S10 is now wound clockwise onto the pole tooth Z1, and the coil end is contacted with the lamination L12. From lamination L12, the winding wire is now transferred as indicated by the arrow to the segment c) in FIG. 4.

Figure 4C:
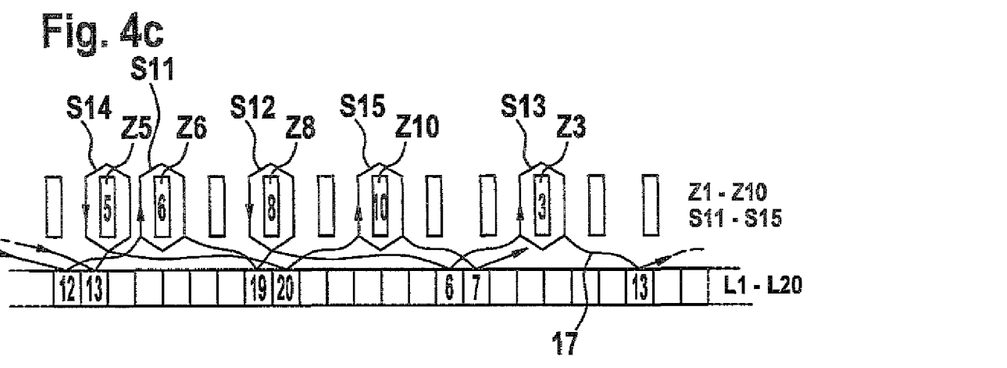

There, the coil S11, beginning at lamination L12, is wound clockwise around the pole tooth Z6, and the coil end is placed at lamination 19. From there, the coil S12 is wound counterclockwise onto the pole tooth Z8, and the coil end is placed at lamination L6. From there, the coil S13 is wound clockwise onto the pole tooth 73, and the coil end is contacted with lamination L13. From L13, the coil S14 is now wound counterclockwise onto the pole tooth Z5, and the coil end is contacted with the lamination L20. From there, the coil S15 is wound clockwise onto the pole tooth Z10, and the end is contacted with the lamination L7. From there, the winding wire is transferred as indicated by the arrow to segment d) of FIG. 4.

Figure 4D:
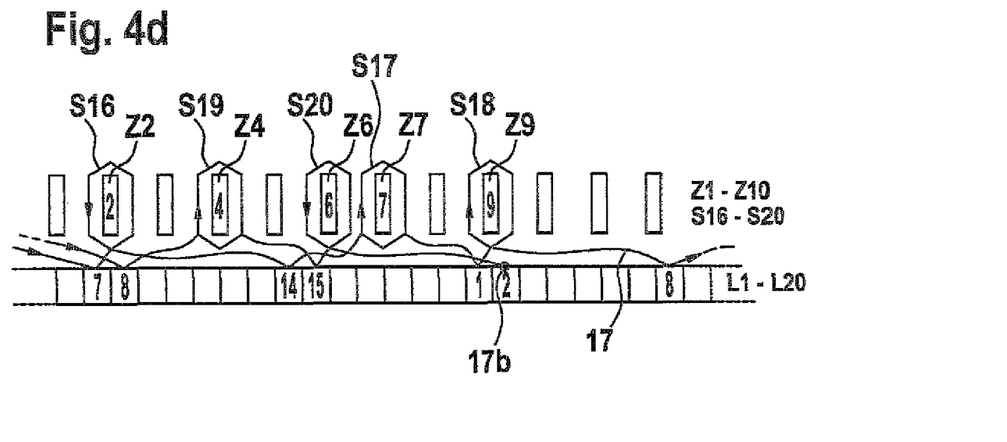

From lamination L7 the coil S16 is now wound counterclockwise onto the pole tooth Z2, and the coil end is contacted with the lamination L14. From there, the coil S17 is wound clockwise onto the pole tooth Z73 and the coil end is contacted with the lamination L1. The coil S18 is wound from there counterclockwise onto the pole tooth Z9, and the coil end is contacted with the lamination L8. From lamination L8, the coil S19 is wound clockwise onto the pole tooth Z4, and its coil end is placed on the lamination L15. Finally, the coil S20 is also wound counterclockwise onto the pole tooth Z6, and the coil end is again place on the lamination L2. The end 17b of the winding wire 17 is capped here. Thus all 20 coils are continuously wound, uniformly distributed, in succession onto all the pole teeth Z. From the winding table of FIG. 3, as well as from FIG. 1, it can be seen that two coils S are wound onto each of the ten pole teeth Z.

In a second exemplary embodiment, by the method described above, a winding table shown in FIG. 5 for a four-pole direct current motor will now be set up, in which the number of teeth z, number of coils s, and number of laminations N will be modified.

For the second exemplary embodiment, the following numbers apply:

| | |
|---|---|
| Number of pole pairs | p = 2 |
| Number of pole teeth | z = 5 |
| Number of laminations | N = 15 |
| Number of coils | s = 15 |
| Multiplier | M = 3 |
| Lamination increment width | Y = 8 |
| Number of windings | Wz = 11 |

With these values, the conditions listed above are met. With the two equations (1), the beginning lamination Lai and end lamination Lei are now defined for each coil Li.

Coil Contacting at the Commutator:

| Lai = (La1 + [(i − 1)*Y]) mod 15; | Lei = (Lai + Y) mod 15 |
|---|---|
| Coil 1: La1 = (3 + (1 − 1)*8) mod 15 = 3; | Le1 = (3 + 8) mod 20 = 11 |
| Coil 2: La2 = (3 + (2 − 1)*8) mod 15 = 11; | Le2 = (11 + 8) mod 20 = 4 |
| Coil 3: La3 = (3 + (3 − 1)*8) mod 15 = 4; | Le3 = (4 + 8) mod 20 = 12 |
| Coil 4: La4 = (3 + (4 − 1)*8) mod 15 = 12; | Le4 = (12 + 8) mod 20 = 5 |
| Coil 5: La5 = (3 + (5 − 1)*8) mod 15 = 5; | Le5 = (5 + 8) mod 20 = 13 |
| Coil 6: La6 = (3 + (6 − 1)*8) mod 15 = 13; | Le6 = (13 + 8) mod 20 = 6 |
| Coil 7: La7 = (3 + (7 − 1)*8) mod 15 = 6; | Le7 = (6 + 8) mod 20 = 14 |
| Coil 8: La8 = (3 + (8 − 1)*8) mod 15 = 14; | Le8 = (14 + 8) mod 20 = 7 |
| Coil 9: La9 = (3 + (9 − 1)*8) mod 15 = 7; | Le9 = (7 + 8) mod 20 = 15 |
| Coil 10: La10 = (3 + (10 − 1)*8) mod 15 = 15; | Le10 = (15 + 8) mod 20 = 8 |
| Coil 11: La11 = (3 + (11 − 1)*8) mod 15 = 8; | Le11 = (8 + 8) mod 20 = 1 |
| Coil 12: La12 = (3 + (12 − 1)*8) mod 15 = 1; | Le12 = (15 + 8) mod 20 = 9 |
| Coil 13: La13 = (3 + (13 − 1)*8) mod 15 = 9; | Le13 = (9 + 8) mod 20 = 2 |
| Coil 14: La14 = (3 + (14 − 1)*8) mod 15 = 2; | Le14 = (15 + 8) mod 20 = 10 |
| Coil 15: La15 = (3 + (15 − 1)*8) mod 15 = 10; | Le15 = (10 + 7) mod 20 = 3 |

Ascertaining Angle Error:
For every coil S, for all the pole teeth Z, the respective angle error Wf is ascertained in accordance with equation (2).
Angle Error of Coil 1:

$$Wf(j) = \cos[2\pi * p/z * (j - Lai/M)]$$

Tooth 1: Wf(1)=cos [$2\pi*\tfrac{2}{5}*(1-3/3)$]=1.000
Tooth 2: Wf(2)=cos [$2\pi*\tfrac{2}{5}*(2-3/3)$]=−0.809
Tooth 3: Wf(3)=cos [$2\pi*\tfrac{2}{5}*(3-3/3)$]=0.309
Tooth 4: Wf(4)=cos [$2\pi*\tfrac{2}{5}*(4-3/3)$]=0.309
Tooth 5: Wf(5)=cos [$2\pi*\tfrac{2}{5}*(5-3/3)$]=−0.809

In the next pass, for coil 1, the pole tooth that has the least angle error Wf, or the greatest angle error cosine value Wfmax, is ascertained, using equation (3):

$$Wfmax = \max(|Wf(1)|, |Wf(2)|, |Wf(3)|, \ldots) = 1.000$$

Figure 5:
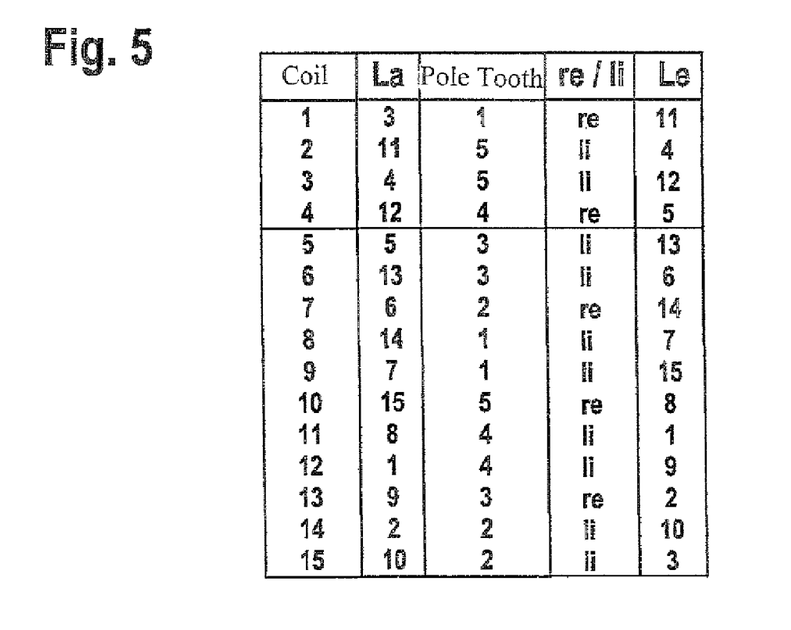
FIG. 5 shows the winding table for a second exemplary embodiment.

Comparison of Angle Error
|Wf(1)|=Wfmax: 1=1: Condition met
|Wf(2)|=Wfmax: 0.809≠1: Condition not met
|Wf(3)|=Wfmax: 0.309≠1: Condition not met
|Wf(4)|=Wfmax: 0.309≠1: Condition not met
|Wf(5)|=Wfmax: 0.809≠1: Condition not met
Outcome of the Comparison:
The coil 1 can be wound onto tooth Z1. The ascertained value is positive, and hence the coil 1 is wound clockwise. Thus the first line of the winding table in FIG. 5 is defined.
Angle Error of Coil 2:

$$Wf(j) = \cos[2\pi * p/z * (j - Lai/M)]$$

Tooth 1: Wf(1)=cos [$2\pi*\tfrac{2}{5}*(1-11/3)$]=0.914
Tooth 2: Wf(2)=cos [$2\pi*\tfrac{2}{5}*(2-11/3)$]=−0.500
Tooth 3: Wf(3)=cos [$2\pi*\tfrac{2}{5}*(3-11/3)$]=−0.105
Tooth 4: Wf(4)=cos [$2\pi*\tfrac{2}{5}*(4-11/3)$]=0.669
Tooth 5: Wf(5)=cos [$2\pi*\tfrac{2}{5}*(5-11/3)$]=−0.978

In the next pass, for coil 2, the pole tooth that has the least angle error Wf, or the greatest angle error cosine value Wfmax, is ascertained, using equation (3):

$$Wfmax = \max(|Wf(1)|, |Wf(2)|, |Wf(3)|, \ldots) = 0.978$$

Comparison of Angle Error
|Wf(1)|=Wfmax: 0.914≠0.978: Condition not met
|Wf(2)|=Wfmax: 0.500≠0.978: Condition not met
|Wf(3)|=Wfmax: 0.105≠0.978: Condition not met
|Wf(4)|=Wfmax: 0.669≠0.978: Condition not met
|Wf(5)|=Wfmax: 0.978=0.978: Condition met
Outcome of the Comparison:
The coil S2 can be wound onto tooth Z3. The ascertained value is negative, and hence the coil 2 is wound counterclockwise. Thus defines the second line of the winding table in FIG. 5 is defined.

The same calculations are now made in accordance with equations (2) and (3) for the remaining coils 3-15, and thus the winding table in FIG. 5 is set up line by line.

Figure 6:
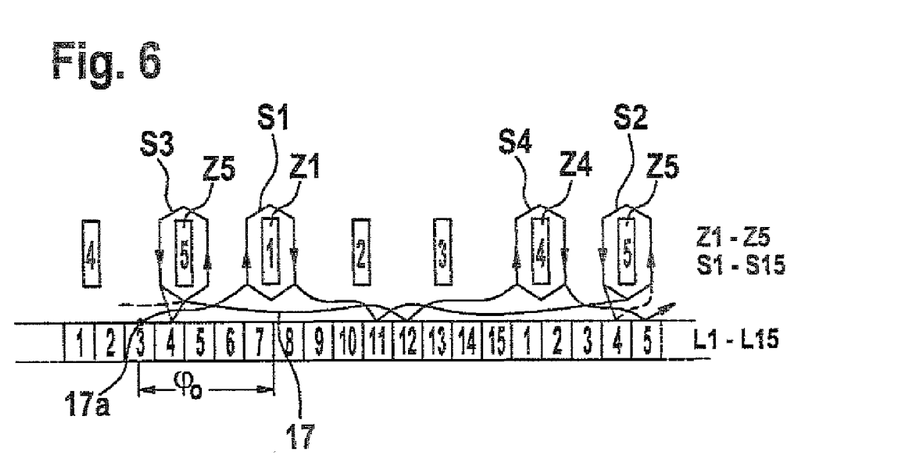
FIG. 6 shows the schematic view of the machine with the production of the first four coils in accordance with the winding table of FIG. 5.

In FIG. 6, the production of the coils is shown and described in a first segment for coils 1 through 4.

Here the winding wire 17 is first, with its beginning 17a, contacted to lamination L3. From there, it is passed to the pole tooth Z1, and the coil S1 is wound clockwise onto the pole tooth Z1. The coil end is contacted with the lamination L11. From there, the coil S2 is now wound counterclockwise onto the pole tooth Z5, and the coil end is placed on lamination L4. From there, the coil S8 is again wound counterclockwise onto the pole tooth Z5, and the coil end is placed on lamination L12. From there, the coil S4 is wound clockwise onto the pole tooth Z4, and the coil end is contacted with the lamination L5. From lamination L5, the winding wire 17 is transferred as indicated by the arrow to the beginning of coil 6, and the winding table is executed by the automatic winder in the same way as in FIG. 4 of the first exemplary embodiment, until all the coils on the rotor of the machine have been continuously wound.

In a third exemplary embodiment, by the method described above, a winding table shown in FIG. 7 for an eight-pole direct current motor will now be set up, in which the number of teeth z, number of coils s, and number of laminations l have been modified.

For the third exemplary embodiment, the following numbers apply:

| | |
|---|---|
| Number of pole pairs | p = 4 |
| Number of pole teeth | z = 9 |
| Number of laminations | N = 27 |
| Number of coils | s = 27 |
| Multiplier | M = 3 |
| Lamination increment width | Y = 7 |
| Number of windings | Wz = 15 |

With these values, the conditions listed above are met. With the two equations (1), the beginning lamination Lai and end lamination Lei are now defined for each coil Li.

Coil Contacting at the Commutator:

| Lai = (La1 + [(i − 1)*Y]) mod 27; | Lei = (Lai + Y) mod 27 |
|---|---|
| Coil 1: La1 = (3 + (1 − 1)*7) mod 27 = 3; | Le1 = (3 + 7) mod 27 = 10 |
| Coil 2: La2 = (3 + (2 − 1)*7) mod 27 = 10; | Le2 = (10 + 7) mod 27 = 17 |
| Coil 3: La3 = (3 + (3 − 1)*7) mod 27 = 17; | Le3 = (17 + 7) mod 27 = 24 |
| Coil 4: La4 = (3 + (4 − 1)*7) mod 27 = 24; | Le4 = (24 + 7) mod 27 = 4 |
| Coil 5: La5 = (3 + (5 − 1)*7) mod 27 = 4; | Le5 = (4 + 7) mod 27 = 11 |
| Coil 6: La6 = (3 + (6 − 1)*7) mod 27 = 11; | Le6 = (11 + 7) mod 27 = 18 |
| Coil 7: La7 = (3 + (7 − 1)*7) mod 27 = 18; | Le7 = (18 + 7) mod 27 = 25 |
| Coil 8: La8 = (3 + (8 − 1)*7) mod 27 = 25; | Le8 = (25 + 7) mod 27 = 5 |
| Coil 9: La9 = (3 + (9 − 1)*7) mod 27 = 5; | Le9 = (5 + 7) mod 27 = 12 |
| Coil 10: La10 = (3 + (10 − 1)*7) mod 27 = 12; | Le10 = (12 + 7) mod 27 = 19 |
| Coil 11: La11 = (3 + (11 − 1)*7) mod 27 = 19; | Le11 = (19 + 7) mod 27 = 26 |
| Coil 12: La12 = (3 + (12 − 1)*7) mod 27 = 26; | Le12 = (26 + 7) mod 27 = 6 |
| Coil 13: La13 = (3 + (13 − 1)*7) mod 27 = 6; | Le13 = (6 + 7) mod 27 = 13 |
| Coil 14: La14 = (3 + (14 − 1)*7) mod 27 = 13; | Le14 = (13 + 7) mod 27 = 20 |
| Coil 15: La15 = (3 + (15 − 1)*7) mod 27 = 20; | Le15 = (20 + 7) mod 27 = 27 |
| Coil 16: La16 = (3 + (16 − 1)*7) mod 27 = 27; | Le16 = (27 + 7) mod 27 = 7 |
| Coil 17: La17 = (3 + (17 − 1)*7) mod 27 = 7; | Le17 = (7 + 7) mod 27 = 14 |
| Coil 18: La18 = (3 + (18 − 1)*7) mod 27 = 14; | Le18 = (14 + 7) mod 27 = 21 |
| Coil 19: La19 = (3 + (19 − 1)*7) mod 27 = 21; | Le19 = (21 + 7) mod 27 = 1 |
| Coil 20: La20 = (3 + (20 − 1)*7) mod 27 = 1; | Le20 = (1 + 7) mod 27 = 8 |
| Coil 21: La21 = (3 + (21 − 1)*7) mod 27 = 8; | Le21 = (8 + 7) mod 27 = 15 |
| Coil 22: La22 = (3 + (22 − 1)*7) mod 27 = 15; | Le22 = (15 + 7) mod 27 = 22 |
| Coil 23: La23 = (3 + (23 − 1)*7) mod 27 = 22; | Le23 = (22 + 7) mod 27 = 2 |
| Coil 24: La24 = (3 + (24 − 1)*7) mod 27 = 2; | Le24 = (2 + 7) mod 27 = 9 |
| Coil 25: La25 = (3 + (25 − 1)*7) mod 27 = 9; | Le25 = (9 + 7) mod 27 = 16 |
| Coil 26: La26 = (3 + (26 − 1)*7) mod 27 = 16; | Le26 = (16 + 7) mod 27 = 23 |
| Coil 27: La27 = (3 + (27 − 1)*7) mod 27 = 23; | Le27 = (23 + 7) mod 27 = 3 |

Ascertaining Angle Error:

For every coil S, for all the pole teeth Z, the respective angle error Wf is ascertained in accordance with equation (2).

Angle Error of Coil 1:

$$Wf(j) = \cos[2\pi * p/z * (j - Lai/M)]$$

Tooth 1: Wf(1)=cos [2π*4/9*(1−3/3)]=1.000
Tooth 2: Wf(2)=cos [2π*4/9*(2−3/3)]=−0.940
Tooth 3: Wf(3)=cos [2π*4/9*(3−3/3)]=−0.766
Tooth 4: Wf(4)=cos [2π*4/9*(4−3/3)]=−0.500
Tooth 5: Wf(5)=cos [2π*4/9*(5−3/3)]=0.174
Tooth 6: Wf(6)=cos [2π*4/9*(6−3/3)]=0.174
Tooth 7: Wf(7)=cos [2π*4/9*(7−3/3)]=−0.500
Tooth 8: Wf(8)=cos [2π*4/9*(8−3/3)]=0.766
Tooth 9: Wf(9)=cos [2π*4/9*(9−3/3)]=0.940

In the next pass, for coil 1, the pole tooth that has the least angle error Wf, or the greatest angle error cosine value Wfmax, is ascertained, using equation (3):

$$Wfmax = \max(|(Wf(1)|, |(Wf(2)|, |(Wf(3)|, \ldots) = 1.0$$

Figure 7:
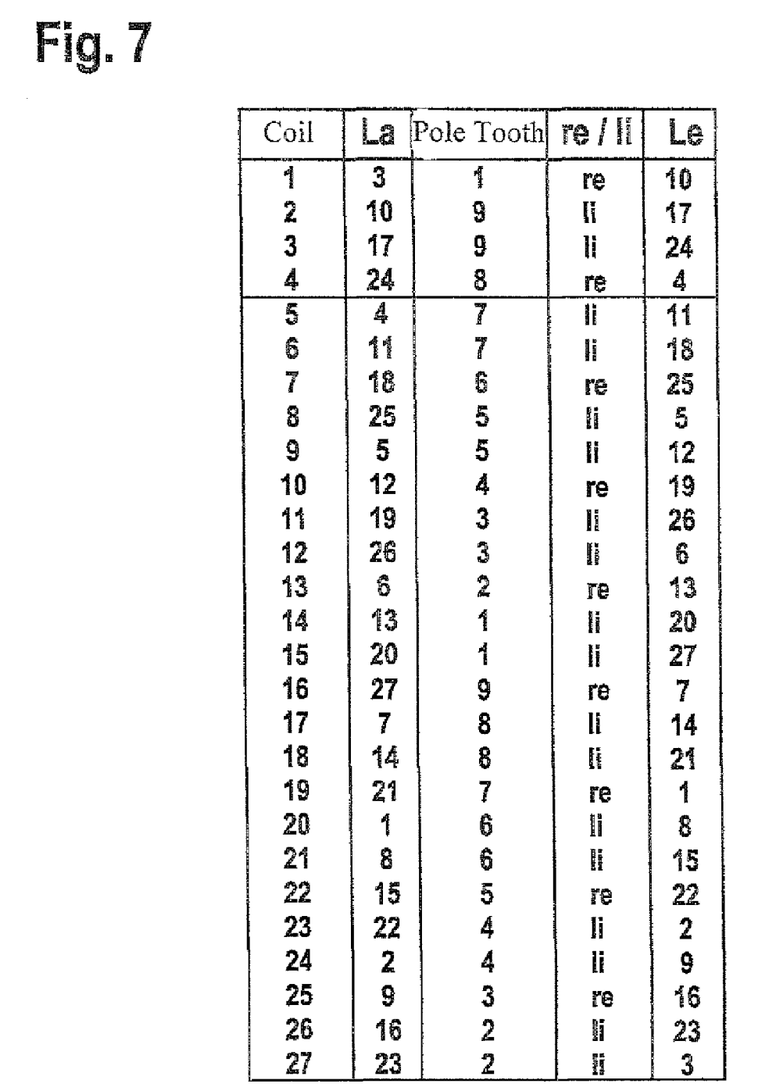
FIG. 7 shows the winding table for a third exemplary embodiment.

Comparison of Angle Error
|Wf(1)|=Wfmax: 1=1: Condition met
|Wf(2)|=Wfmax: 0.94≠1: Condition not met
|Wf(3)|=Wfmax: 0.766≠1: Condition not met
|Wf(4)|=Wfmax: 0.5≠1: (Condition not met
|Wf(5)|=Wfmax: 0.174≠1: Condition not met
|Wf(6)|=Wfmax: 0.174≠1: Condition not met
|Wf(7)|=Wfmax: 0.5≠1: Condition not met
|Wf(8)|=Wfmax: 0.766≠1: Condition not met
|Wf(9)|=Wfmax: 0.94≠1: Condition not met Outcome of the Comparison:

The coil S1 can be wound onto tooth Z1. The ascertained value is positive, and hence the coil 1 is wound clockwise. Thus the first line of the winding table in FIG. 7 is defined.

Angle Error of Coil 2:

$$Wf(j) = \cos[2\pi * p/z * (j - Lai/M)]$$

Tooth 1: Wf(1)=cos [2π*4/9*(1−10/3)]=0.973
Tooth 2: Wf(2)=cos [2π*4/9*(2−10/3)]=−0.835
Tooth 3: Wf(3)=cos [2π*4/9*(3−10/3)]=0.597
Tooth 4: Wf(4)=cos [2π*4/9*(4−10/3)]=−0.287
Tooth 5: Wf(5)=cos [2π*4/9*(5−10/3)]=−0.058
Tooth 6: Wf(6)=cos [2π*4/9*(6−10/3)]=0.396
Tooth 7: Wf(7)=cos [2π*4/9*(7−10/3)]=−0.686
Tooth 8: Wf(8)=cos [2π*4/9*(8−10/3)]=0.894
Tooth 9: Wf(9)=cos [2π*4/9*(9−10/3)]=−0.993

In the next pass, for coil 2, the pole tooth that has the least angle error Wf, or the greatest angle error cosine value Wfmax, is ascertained, using equation (3):

$$Wfmax = \max(|(Wf(1)|, |(Wf(2)|, |(Wf(3)|, \ldots) = 0.993$$

Comparison of Angle Error
|Wf(1)|=Wfmax: 0.973≠0.993: Condition not met
|Wf(2)|=Wfmax: 0.835≠0.993: Condition not met
|Wf(3)|=Wfmax: 0.597≠0.993: Condition not met
|Wf(4)|=Wfmax: 0.287≠0.993: Condition not met
|Wf(5)|=Wfmax: 0.058≠0.993: Condition not met
|Wf(6)|=Wfmax: 0.396≠0.993: Condition not met
|Wf(7)|=Wfmax: 0.686≠0.993: Condition not met
|Wf(8)|=Wfmax: 0.894≠0.993: Condition not met
|Wf(9)|=Wfmax: 0.993=0.993: Condition met Outcome of the Comparison:

The coil S2 can be wound onto tooth Z9. The ascertained value is negative, and hence the coil 2 is wound counterclockwise. Thus the second line of the winding table in FIG. 7 is defined.

The same calculations are now made in accordance with equations (2) and (3) for the remaining coils 3-27, and thus the winding table in FIG. 7 is set up line by line.

Figure 8:
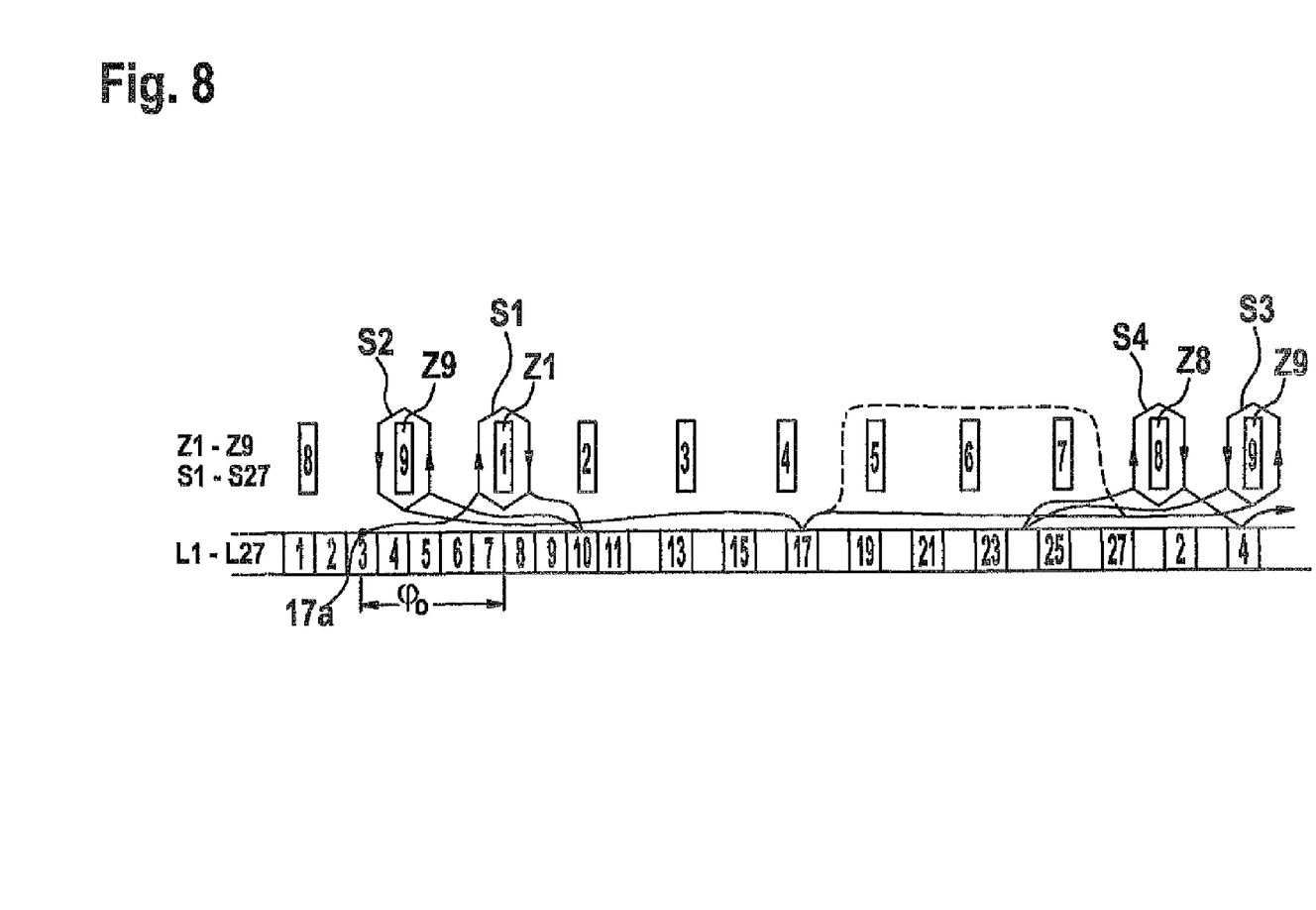
FIG. 8 shows the electric machine schematically, with the first four coils produced in accordance with the winding table of FIG. 7.

In FIG. 8, the production of the coils is shown and described in a first segment for coils 1 through 4.

Here the winding wire 17 is first, with its beginning 17a, contacted to lamination L3. From there, it is passed to the pole tooth 71, and the coil S1 is wound clockwise onto the pole tooth Z1. The coil end is contacted with the lamination L10. From there, the coil S2 is now wound counterclockwise onto the pole tooth Z9, and the coil end is placed on lamination L17. From there, the coil S3 is again wound counterclockwise onto the pole tooth Z9, and the coil end is placed on lamination L24. From there, the coil S4 is wound clockwise onto the pole tooth Z8, and the coil end is contacted with the lamination L4. From lamination L4, the coil wire is transferred as indicated by the arrow to the beginning of coil 5, and the winding table is executed by the automatic winder in the same way as in FIG. 4 of the first exemplary embodiment, until all the coils on the rotor of the machine have been continuously wound.

To avoid long connections between the laminations and the coils on the commutator side of the rotor 13, it may be useful to pass the winding wire 17 between the beginning or end lamination La, Le and a coil S between two more closely located pole teeth Z to the back side of the armature, and from there, particularly between two further pole teeth Z, back to the front side and then to pass it to the coil S or the lamination L, as shown in dashed lines in FIG. 8 for the coil S3.

In a fourth exemplary embodiment, by the method described above, a winding table shown in FIG. 9 for a ten-pole direct current motor will now be set up, in which the number of teeth z, number of coils s, and number of laminations l have been modified.

For the first exemplary embodiment, the following numbers apply:

| | |
|---|---|
| Number of pole pairs | p = 5 |
| Number of pole teeth | z = 12 |
| Number of laminations | N = 24 |
| Number of coils | s = 24 |
| Multiplier | M = 2 |
| Lamination increment width | Y = 5 |
| Number of windings | Wz = 18 |

With these values, the conditions listed above are met. With the two equations (1), the beginning lamination Lai and end lamination Lei are now defined for each coil Li.

Coil Contacting at the Commutator:

| Lai = (La1 + [(i − 1)*Y]) mod 24; Lei = (Lai + Y) mod 24 | |
|---|---|
| Coil 1: La1 = (2 + (1 − 1)*5) mod 24 = 2; | Le1 = (2 + 5) mod 24 = 7 |
| Coil 2: La2 = (2 + (2 − 1)*5) mod 24 = 7; | Le2 = (9 + 5) mod 24 = 12 |
| Coil 3: La3 = (2 + (3 − 1)*5) mod 24 = 12; | Le3 = (16 + 5) mod 24 = 17 |
| Coil 4: La4 = (2 + (4 − 1)*5) mod 24 = 17; | Le4 = (3 + 5) mod 24 = 22 |
| Coil 5: La5 = (2 + (5 − 1)*5) mod 24 = 22; | Le5 = (10 + 5) mod 24 = 3 |
| Coil 6: La6 = (2 + (6 − 1)*5) mod 24 = 3; | Le6 = (17 + 5) mod 24 = 8 |
| Coil 7: La7 = (2 + (7 − 1)*5) mod 24 = 8; | Le7 = (4 + 5) mod 24 = 13 |
| Coil 8: La8 = (2 + (8 − 1)*5) mod 24 = 13; | Le8 = (11 + 5) mod 24 = 18 |
| Coil 9: La9 = (2 + (9 − 1)*5) mod 24 = 18; | Le9 = (18 + 5) mod 24 = 23 |
| Coil 10: La10 = (2 + (10 − 1)*5) mod 24 = 23; | Le10 = (5 + 5) mod 24 = 4 |
| Coil 11: La11 = (2 + (11 − 1)*5) mod 24 = 4; | Le11 = (12 + 5) mod 24 = 9 |
| Coil 12: La12 = (2 + (12 − 1)*5) mod 24 = 9; | Le12 = (19 + 5) mod 24 = 14 |
| Coil 13: La13 = (2 + (13 − 1)*5) mod 24 = 14; | Le13 = (6 + 5) mod 24 = 19 |
| Coil 14: La14 = (2 + (14 − 1)*5) mod 24 = 19; | Le14 = (13 + 5) mod 24 = 24 |
| Coil 15: La15 = (2 + (15 − 1)*5) mod 24 = 24; | Le15 = (20 + 5) mod 24 = 5 |
| Coil 16: La16 = (2 + (16 − 1)*5) mod 24 = 5; | Le16 = (7 + 5) mod 24 = 10 |
| Coil 17: La17 = (2 + (17 − 1)*5) mod 24 = 10; | Le17 = (14 + 5) mod 24 = 15 |
| Coil 18: La18 = (2 + (18 − 1)*5) mod 24 = 15; | Le18 = (1 + 5) mod 24 = 20 |
| Coil 19: La19 = (2 + (19 − 1)*5) mod 24 = 20; | Le19 = (8 + 5) mod 24 = 1 |
| Coil 20: La20 = (2 + (20 − 1)*5) mod 24 = 1; | Le20 = (15 + 5) mod 24 = 6 |
| Coil 21: La21 = (2 + (11 − 1)*5) mod 24 = 6; | Le21 = (12 + 5) mod 24 = 11 |
| Coil 22: La22 = (2 + (12 − 1)*5) mod 24 = 11; | Le22 = (19 + 5) mod 24 = 16 |
| Coil 23: La23 = (2 + (13 − 1)*5) mod 24 = 16; | Le23 = (6 + 5) mod 24 = 21 |
| Coil 24: La24 = (2 + (14 − 1)*5) mod 24 = 21; | Le24 = (13 + 5) mod 24 = 2 |

Ascertaining Angle Error:

For every coil S, for all the pole teeth Z, the respective angle error Wf is ascertained in accordance with equation (2).

Angle Error of Coil 1:

$$Wf(j) = \cos[2\pi \cdot p/z \cdot (j - Lai/M)]$$

Tooth 1: $Wf(1) = \cos[2\pi \cdot 5/12 \cdot (1 - 2/2)] = 1.000$
Tooth 2: $Wf(2) = \cos[2\pi \cdot 5/12 \cdot (2 - 2/2)] = -0.866$
Tooth 3: $Wf(3) = \cos[2\pi \cdot 5/12 \cdot (3 - 2/2)] = 0.500$
Tooth 4: $Wf(4) = \cos[2\pi \cdot 5/12 \cdot (4 - 2/2)] = 0.000$
Tooth 5: $Wf(5) = \cos[2\pi \cdot 5/12 \cdot (5 - 2/2)] = -0.500$
Tooth 6: $Wf(6) = \cos[2\pi \cdot 5/12 \cdot (6 - 2/2)] = 0.866$
Tooth 7: $Wf(7) = \cos[2\pi \cdot 5/12 \cdot (7 - 2/2)] = -1.000$
Tooth 8: $Wf(8) = \cos[2\pi \cdot 5/12 \cdot (8 - 2/2)] = 0.866$
Tooth 9: $Wf(9) = \cos[2\pi \cdot 5/12 \cdot (9 - 2/2)] = -0.500$
Tooth 10: $Wf(10) = \cos[2\pi \cdot 5/12 \cdot (10 - 2/2)] = 0.000$
Tooth 11: $Wf(11) = \cos[2\pi \cdot 5/12 \cdot (11 - 2/2)] = 0.500$
Tooth 12: $Wf(12) = \cos[2\pi \cdot 5/12 \cdot (12 - 2/2)] = -0.866$ In the next pass, for coil 1, the pole tooth that has the least angle error Wf, or the greatest angle error cosine value Wfmax, is ascertained, using equation (3):

$$Wfmax = \max(|(Wf(1)|, |(Wf(2)|, |(Wf(3)|, \ldots) = 1.000$$

Figure 9:
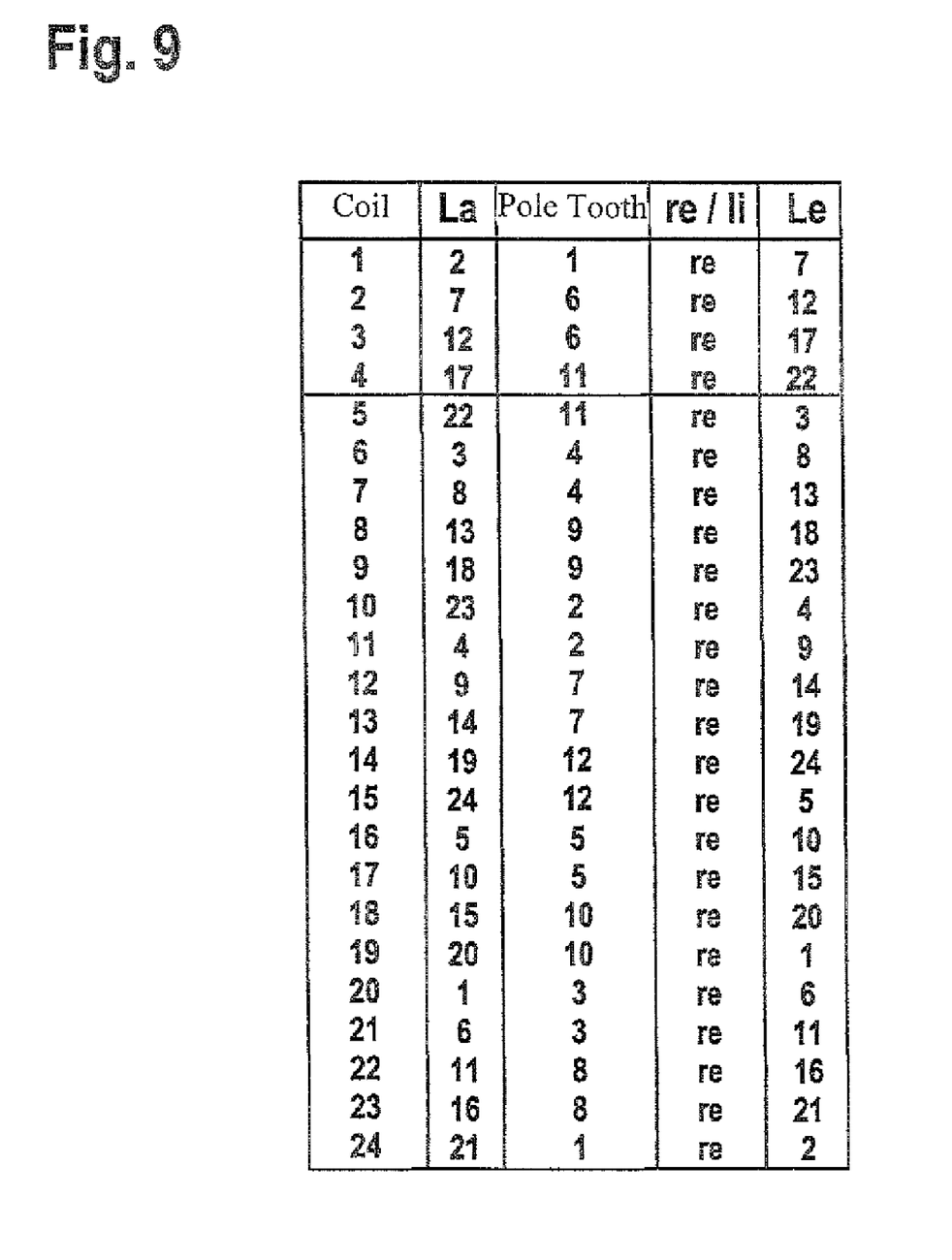
FIG. 9 shows the winding table for a fourth exemplary embodiment.

Comparison of Angle Error
|Wf(1)|=Wfmax: 1=1: Condition met
|Wf(2)|=Wfmax: 0.866≠1: Condition not met
|Wf(3)|=Wfmax: 0.5≠1: Condition not met
|Wf(4)|=Wfmax: 0.000≠1: Condition not met
|Wf(5)|=Wfmax: 0.5≠1: Condition not met
|Wf(6)|=Wfmax: 0.866≠1: Condition not met
|Wf(7)|=Wfmax: 1=1: Condition met
|Wf(8)|=Wfmax: 0.866≠1: Condition not met
|Wf(9)|=Wfmax: 0.5≠1: Condition not met
|Wf(10)|=Wfmax: 0.000≠1: Condition not met
|Wf(11)|=Wfmax: 0.5≠1: Condition not met
|Wf(12)|=Wfmax: 0.866≠1: Condition not met Outcome of the Comparison:

The coil S1 can be wound onto tooth Z1. The ascertained value is positive, and hence the coil 1 is wound clockwise. Thus the first line of the winding table in FIG. 9 is defined.

Angle Error of Coil 2:

$$Wf(j)=\cos[2\pi*p/z*(j-kai/M)]$$

Tooth 1: Wf(1)=cos [2π*5/12*(1−7/2)]=0.966
Tooth 2: Wf(2)=cos [2π*5/12*(2−7/2)]=−0.707
Tooth 3: Wf(3)=cos [2π*5/12*(3−7/2)]=0.259
Tooth 4: Wf(4)=cos [2π*5/12*(4−7/2)]=0.259
Tooth 5: Wf(5)=cos [2π*5/12*(5−7/2)]=−0.707
Tooth 6: Wf(6)=cos [2π*5/12*(6−7/2)]=0.966
Tooth 7: Wf(7)=cos [2π*5/12*(7−7/2)]=−0.966
Tooth 8: Wf(8)=cos [2π*5/12*(8−7/2)]=0.707
Tooth 9: Wf(9)=cos [2π*5/12*(9−7/2)]=−0.259
Tooth 10: Wf(10)=cos [2π*5/12*(10−7/2)]=−0.259
Tooth 11: Wf(11)=cos [2π*5/12*(11−7/2)]=0.707
Tooth 12: Wf(12)=cos [2π*5/12*(12−7/2)]=−0.966

In the next pass, for coil 2, the pole tooth that has the least angle error Wf, or the greatest angle error cosine value Wfmax, is ascertained, using equation (3):

$$Wfmax=\max(|(Wf(1)|,|(Wf(2)|,|(Wf(3)|,\ldots)=0.966$$

Comparison of Angle Error
|Wf(1)|=Wfmax: 0.966=0.966: Condition met
|Wf(2)|=Wfmax: 0.707≠0.966. Condition not met
|Wf(3)|=Wfmax: 0.259≠0.966: Condition not met
|Wf(4)|=Wfmax: 0.259≠0.966: Condition not met
|Wf(5)|=Wfmax: 0.707≠0.966: Condition not met
|Wf(6)|=Wfmax: 0.966=0.966: Condition met
|Wf(7)|=Wfmax: 0.966=0.966: Condition met
|Wf(8)|=Wfmax: 0.707≠0.966: Condition not met
|Wf(9)|=Wfmax: 0.259≠0.966: Condition not met
|Wf(10)|=Wfmax: 0.259≠0.966: Condition not met
|Wf(11)|=Wfmax: 0.707≠0.966: Condition not met
|Wf(12)|=Wfmax: 0.066=0.966: Condition met Outcome of the Comparison:
The coil S2 can be wound onto tooth Z6. The ascertained value is positive, and hence the coil 2 is wound clockwise. Thus the second line of the winding table in FIG. 9 is defined.

The same calculations are now made in accordance with equations (2) and (3) for the remaining coils 3-27, and thus the winding table in FIG. 7 is set up line by line.

Figure 10:
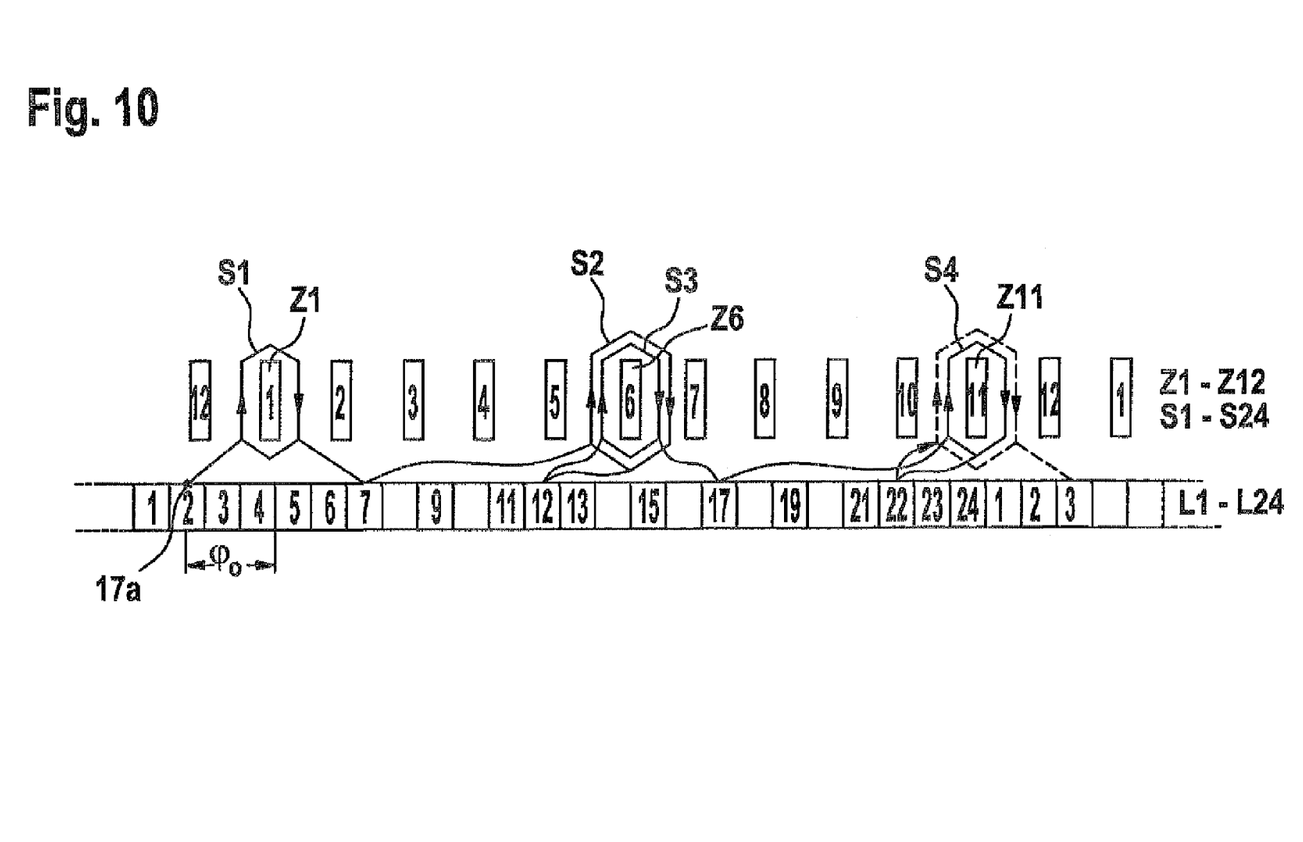
FIG. 10 shows the electric machine schematically, with the first four coils, produced in accordance with the winding table of FIG. 9.

In FIG. 10, the production of the coils is shown and described in a first segment for coils 1 through 4.

Here the winding wire 17 is first, with its beginning 17a, contacted to lamination L2. From there, it is passed to the pole tooth Z1, and the coil S1 is wound clockwise onto the pole tooth Z1. The coil end is contacted with the lamination L7. From there, the coil S2 is now wound clockwise onto the pole tooth Z6, and the coil end is placed on lamination L12. From there, the coil S3 is again wound clockwise onto the pole tooth Z6, and the coil end is placed on lamination L17. From there, the coil S4 is wound clockwise onto the pole tooth Z11, and the coil end is contacted with the lamination L22. From lamination L22, the coil wire is transferred as indicated by the arrow to the beginning of coil 6 by the automatic winder in the same way as in FIG. 4 of the first exemplary embodiment, until all the coils on the rotor of the machine have been continuously wound.

The invention is not limited to the exemplary embodiments shown, since many combinations to realize the invention are obtained within the context of the following conditions:

| | |
|---|---|
| P > N < z | for the number of pole pairs; |
| z ≠ 2p ≠ 3p | for the number of teeth; |
| M = s/z | for the multiplier; and |
| \|Y−N/p\| ≦ 0.5 | for the lamination increment width. |

For ascertaining the electrical angle error of the coils with regard to the respective pole teeth, instead of the cosine value in equation (2), the sine value may be used. In the same way, the electrical angle error referred to the pole pitch can be ascertained as an arc amount, if the cosine is omitted from equation (2). An absolute angle error of the coils referred to the entire circumference is obtained by omitted "p" in equation (2), which is likewise possible within the scope of the invention. Then, however, the angle error must be corrected with the number of poles, or in other words with modular 2π/2p. Finally, the angle error can also be ascertained in degrees, if the term "2π" is replaced with "360°" and the result is corrected with modular 360°/2p. In either case, however, to set up the winding table for each coil, the pole tooth having the least angle error must be ascertained.

In winding machines with two so-called flyers or needles offset from one another by 180°, half the number of coils can also be continuously wound, in the case where there is an even number s of coils as in FIGS. 3 and 9; in other words, the upper and lower halves of the winding table set up according to the invention are simultaneously executed by one flyer or needle each.

The foregoing relates to a preferred exemplary embodiment of the invention, it being understood that other variants and embodiments thereof are possible within the spirit and scope of the invention, the latter being defined by the appended claims.

The invention claimed is:

1. A method for the production of the rotor winding of an electric machine, the electric machine having at least four exciter poles in the stator and having a commutator rotor, which has a number of slots and pole teeth on its circumference, which number differs from the number of exciter poles, and having a number of single-tooth coils and an equal number of commutator laminations, which number is at least twice as large as the number of pole teeth, and the single-tooth coils are wound, in a substantially uniformly distributed manner, and in particular continuously wound, onto the pole teeth with a winding wire by an automatic winder, the method comprising the steps of securing the winding wire at a beginning lamination to a first pole tooth, then winding a first coil with a freely selectable angular offset to its beginning lamination and with a predetermined number of windings; then securing the winding wire, at a fixedly predetermined lamination increment width to a further commutator lamination as an end lamination; then successively, from each commutator lamination, winding a respective coil onto the pole tooth that has the least electrical angle error, referred to a pole pitch, to the selected angular offset and then connecting the winding wire, at the predetermined lamination increment width, to a further lamination, until all the single-tooth coils have been wound onto the pole teeth, wherein the lamination increment width of the single-tooth coils is predetermined, as a function of the number of laminations and the number of pole pairs of the stator, such that the equation |Y−N/p|≦0.5 is satisfied, wherein Y is the lamination increment width, N is the number of laminations, and the and p is the number of pole pairs.

2. The method as defined by claim 1, wherein the end of the first single-tooth coil is contacted with the lamination that was ascertained beforehand in accordance with the equation Le1=(La1+Y) mod N, and this lamination forms the lamination for the beginning of the next single-tooth coil to be wound; and wherein after that, each further coil is contacted, at the lamination increment width, with the laminations of the commutator, wherein Le1 is the end lamination of the first coil, La1 is the beginning lamination of the first coil, and Y is the lamination increment width.

3. The method as defined by claim 1, wherein, for each next coil i to be wound, first for each of the pole teeth at the rotor the electrical angle error is ascertained; wherein then absolute values of the ascertained electrical angle errors are compared with one another; and wherein by means of this comparison, finally, the pole tooth having the least electrical angle error is ascertained, and the next coil i is wound onto that pole tooth.

4. The method as defined by claim 3, wherein for each pole tooth, the electrical angle error is ascertained as a cosine value of the periodic electrical angle error relative to the number of pole pairs, in each case in accordance with the equation $Wf(j)=\cos[2\pi*p/z*(j-Lai/M)]$, in which Wf is the electrical angle error, p is the number of pole pairs, z is the number of pole teeth, Lai is the beginning lamination of respective coil i, the multiplier M is the number of coils per pole tooth, and j is the particular pole tooth.

5. The method as defined by claim 3, wherein the cosine values of the electrical angle errors ascertained for each tooth are compared with one another; wherein the next coil i is wound onto the pole tooth having the greatest absolute electrical angle error cosine value; and wherein the winding direction of the coil is determined by the sign of the electrical angle error cosine value.

6. The method as defined by claim 3, wherein for each particular pole tooth j, the electrical angle error is ascertained as a cosine value of the periodic electrical angle error relative to the number of pole pairs, in each case in accordance with the equation $Wf(j)=\cos[2\pi*p/z*(j-Lai/M)]$, in which the multiplier M is the number of coils per pole tooth, and j is the particular pole tooth; wherein the cosine values of the electrical angle errors ascertained for each tooth are compared with one another; wherein the next coil i is wound onto the pole tooth having the greatest absolute angle error cosine value; wherein the winding direction of the coil is determined by the sign of the electrical angle error cosine value; and wherein, if the greatest electrical angle error cosine values for a plurality of pole teeth are equal, the next coil is wound onto a pole tooth that does not yet have the number of coils redetermined by the multiplier M.

7. The method as defined by claim 6, wherein the next coil i is wound onto the pole tooth which is located in the region between the beginning lamination and the end lamination of that coil.

8. The method as defined by claim 1, wherein a plurality of single-tooth coils are continuously wound in succession without interruption of the winding wire, and wherein the beginning and end of the single-tooth coils are contacted, as a wave winding, in one and the same winding direction at the lamination increment width, with the respective commutator laminations.

9. The method as defined by claim 1, wherein each winding wire is passed from the beginning lamination to the end lamination thereof, between two pole teeth located closer to the beginning lamination than the end lamination, to a back side of the armature, and from there, between two further pole teeth, located closer to the end lamination than the beginning lamination, back to a front side of the armature, and then to the coil and the end lamination.

10. The method as defined by claim 1, wherein the beginning and end laminations and the pole tooth and the winding direction of the coils are ascertained as parameters by a computer in the form of a winding table, which is input into an automatic winder and processed by it in winding the coils.

11. The method as defined by claim 1, wherein, for a four-pole electric machine, fifteen single-tooth coils are continuously wound onto its rotor by an automatic winder onto five pole teeth; and wherein the single-tooth coils, at a lamination increment width of eight laminations, are contacted with fifteen laminations of a commutator.

12. The method as defined by claim 1, wherein, for a six-pole electric machine, twenty single-tooth coils are continuously wound onto its rotor by an automatic winder onto ten pole teeth; and wherein the single-tooth coils, at a lamination increment width of seven laminations, are contacted with twenty laminations of a commutator.

13. The method as defined by claim 1, wherein, for an eight-pole electric machine, twenty-seven single-tooth coils are continuously wound onto its rotor by an automatic winder onto nine pole teeth; and wherein the single-tooth coils, at a lamination increment width of seven laminations, are contacted with twenty-seven laminations of a commutator.

14. The method as defined by claim 1, wherein, for a ten-pole electric machine, twenty-four single-tooth coils are continuously wound onto its rotor by an automatic winder onto twelve pole teeth; and wherein the single-tooth coils, at a lamination increment width of five laminations, are contacted with twenty-four laminations of a commutator.

* * * * *